US011922852B2

(12) United States Patent
Li

(10) Patent No.: US 11,922,852 B2
(45) Date of Patent: Mar. 5, 2024

(54) DISPLAY DEVICE AND DRIVING SYSTEM THEREOF

(71) Applicant: TCL CHINA STAR OPTOELECTRONICS TECHNOLOGY CO., LTD., Guangdong (CN)

(72) Inventor: Wenfang Li, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 404 days.

(21) Appl. No.: 16/972,901

(22) PCT Filed: Oct. 22, 2020

(86) PCT No.: PCT/CN2020/122897
§ 371 (c)(1),
(2) Date: Dec. 7, 2020

(87) PCT Pub. No.: WO2022/047917
PCT Pub. Date: Mar. 10, 2022

(65) Prior Publication Data
US 2022/0319384 A1 Oct. 6, 2022

(30) Foreign Application Priority Data
Sep. 2, 2020 (CN) ........................ 202010909825.0

(51) Int. Cl.
*G09G 3/20* (2006.01)
*G09G 3/00* (2006.01)

(52) U.S. Cl.
CPC ........... *G09G 3/2092* (2013.01); *G09G 3/006* (2013.01); *G09G 2330/028* (2013.01); *G09G 2330/12* (2013.01)

(58) Field of Classification Search
CPC ................. G09G 3/2092; G09G 3/006; G09G 2330/028; G09G 2330/12; G09G 2330/02; G09G 2330/026; G09G 3/20
See application file for complete search history.

(56) References Cited

U.S. PATENT DOCUMENTS 10,347,192 B2 * 7/2019 Zou ...................... G09G 3/3406
2007/0057936 A1 * 3/2007 Lee .................... H05B 45/3725 345/211
2008/0088550 A1 * 4/2008 Kim ...................... H05B 45/38 345/82
(Continued)

FOREIGN PATENT DOCUMENTS

CN 101409048 A 4/2009
CN 101764516 A 6/2010
(Continued)

*Primary Examiner* — Jose R Soto Lopez

(57) ABSTRACT

A display device and a driving system thereof are provided. The driving system of the display device includes a control module, a voltage conversion module, and a detection module which are interconnected. The detection module is added in the driving system of the display device to ensure that the voltage conversion module outputs a stable target voltage when the voltage conversion module is operated normally.

16 Claims, 3 Drawing Sheets

(56) References Cited

U.S. PATENT DOCUMENTS

| | | | | |
|---|---|---|---|---|
| 2009/0097180 | A1* | 4/2009 | Feng | H05B 41/2855 361/91.1 |
| 2010/0079088 | A1* | 4/2010 | Lipcsei | H05B 45/20 315/297 |
| 2011/0156482 | A1* | 6/2011 | Yang | H02J 9/06 307/66 |
| 2013/0328520 | A1* | 12/2013 | Chen | H02M 1/32 320/107 |
| 2014/0198540 | A1* | 7/2014 | Xu | H02M 3/33523 363/21.12 |
| 2015/0171732 | A1* | 6/2015 | Kim | G09G 3/3225 345/212 |
| 2015/0188431 | A1* | 7/2015 | Cho | G09G 3/3225 345/212 |
| 2015/0244267 | A1* | 8/2015 | Park | H02M 3/1588 345/76 |
| 2017/0170726 | A1* | 6/2017 | Lee | G09G 3/2092 |
| 2017/0309221 | A1* | 10/2017 | Yang | G09G 5/006 |
| 2018/0035512 | A1* | 2/2018 | Nagao | H05B 45/50 |
| 2019/0027103 | A1* | 1/2019 | Zhang | G09G 3/20 |
| 2020/0152121 | A1* | 5/2020 | Sung | G09G 3/3275 |
| 2020/0394953 | A1* | 12/2020 | Kim | G09G 3/32 |
| 2022/0045600 | A1* | 2/2022 | Shen | H02M 3/33576 |

FOREIGN PATENT DOCUMENTS

| | | | |
|---|---|---|---|
| CN | 104715709 | A | 6/2015 |
| CN | 106856082 | A | 6/2017 |
| CN | 111179845 | A | 5/2020 |
| JP | 2012100392 | A | 5/2012 |

* cited by examiner

DISPLAY DEVICE AND DRIVING SYSTEM THEREOF

TECHNICAL FIELD

The present disclosure relates to a display technology field, and more particularly to a display device and a driving system thereof.

BACKGROUND

A display device generally includes a display panel and an external driving system. The external driving system generally includes a control board (PCB) and a system on chip (SOC). The control board includes components including a timing controller (TCON) and a power management integrated circuit (PMIC) and disposed thereon. In the conventional driving system of the display device, when the driving system of the display device is powered on, the power management integrated circuit outputs a stable voltage to other components via a voltage conversion module to control the corresponding components to be operated normally.

During the stage of powering on the driving system of the display device, the voltage conversion module might be short-circuited, so that voltages outputted to the corresponding components are high to damage the components.

SUMMARY OF DISCLOSURE

The present disclosure provides a display device and a driving system thereof to solve the problem that the voltage conversion module is short-circuited, so that voltages outputted to the corresponding components are high to damage the components.

The present disclosure provides a driving system of a display device, including:

- a control module, wherein the control module includes a first control terminal, a second control terminal, a first feedback terminal, and a second feedback terminal, and the control module is configured to output a first control signal at the first control terminal and output a second control single at the second control terminal under control of a first feedback signal received at the first feedback terminal and a second feedback signal received at the second feedback terminal;
- a voltage conversion module, wherein the voltage conversion module receives an input voltage and is electrically connected to the first control terminal, the second control terminal, and the first feedback terminal, and the voltage conversion module is configured to convert the input voltage into a target voltage and output the first feedback signal to the first feedback terminal under control of the first control signal and the second control signal; and
- a detection module, wherein the detection module receives a third control signal and is electrically connected to the first feedback terminal and the second feedback terminal, and the detection module is configured to detect, under control of the third control signal after the display device is turned on, a voltage level at the first feedback terminal, and is configured to output the second feedback signal to the second feedback terminal based on the voltage level at the first feedback terminal.

In the driving system of the display device of the present disclosure, the control module further includes a third control terminal, and the control module is further configured to output the third control signal to the detection module via the third control terminal after the display device is turned on.

In the driving system of the display device of the present disclosure, the detection module includes:

- a current source;
- a switch element, wherein a first electrode of the switch element receives the third control signal, a second electrode of the switch element receives the current source, and a third electrode of the switch element is electrically connected to the first feedback terminal; and
- a comparator, wherein a first terminal of the comparator receives a threshold voltage, a second terminal of the comparator is connected to the first feedback terminal, and an output terminal of the comparator is connected to the second feedback terminal.

In the driving system of the display device of the present disclosure, the switch element is a transistor or a three-state gate.

In the driving system of the display device of the present disclosure, the current source has a predetermined current value and a predetermined charge time, and the predetermined current value and the predetermined charge time are set according to the input voltage and the target voltage.

In the driving system of the display device of the present disclosure, the predetermined current value is ranged from 80 microamperes to 150 microamperes, and the predetermined charge time is ranged from 0.5 milliseconds to 1.5 milliseconds.

In the driving system of the display device of the present disclosure, the voltage conversion module includes a first transistor, a second transistor, an inductor, a capacitor, a diode, a first resistor, and a second resistor;

- a gate electrode of the first transistor is connected to the first control terminal, a source of the first transistor receives the input voltage, a drain electrode of the first transistor, a source electrode of the second transistor, a first terminal of the inductor, and a cathode of the diode are connected together, a gate electrode of the second transistor is connected to the second control terminal, a drain electrode of the second transistor is grounded, a second terminal of the inductor, a first terminal of the capacitor, and a first terminal of the first resistor are connected to a target voltage output terminal, the target voltage output terminal outputs the target voltage, a second terminal of the first resistor and a first terminal of the second resistor are connected to the first feedback terminal, and an anode of the diode, a second terminal of the capacitor, and a second terminal of the second resistor are grounded.

In the driving system of the display device of the present disclosure, the driving system of the display device further includes a power management integrated chip, and the control module, the detection module, the first transistor, and the second transistor are integrated and disposed in the power management integrated chip.

In the driving system of the display device of the present disclosure, the driving system of the display device further includes a timing control chip, the timing control chip is connected to the voltage conversion module, and the timing control chip is configured to receive the target voltage.

Correspondingly, the present disclosure further provides a display device including a driving system of the display device. The driving system of the display device includes:

- a control module, wherein the control module includes a first control terminal, a second control terminal, a first feedback terminal, and a second feedback terminal, and the control module is configured to output a first control signal at the first control terminal and output a second control single at the second control terminal under control of a first feedback signal received at the first feedback terminal and a second feedback signal received at the second feedback terminal;

a voltage conversion module, wherein the voltage conversion module receives an input voltage and is electrically connected to the first control terminal, the second control terminal, and the first feedback terminal, and the voltage conversion module is configured to convert the input voltage into a target voltage and output the first feedback signal to the first feedback terminal under control of the first control signal and the second control signal; and a detection module, wherein the detection module receives a third control signal and is electrically connected to the first feedback terminal and the second feedback terminal, and the detection module is configured to detect, under control of the third control signal after the display device is turned on, a voltage level at the first feedback terminal, and is configured to output the second feedback signal to the second feedback terminal based on the voltage level at the first feedback terminal.

In the display device of the present disclosure, the control module further includes a third control terminal, and the control module is further configured to output the third control signal to the detection module via the third control terminal after the display device is turned on.

In the display device of the present disclosure, the detection module includes:

a current source;

a switch element, wherein a first electrode of the switch element receives the third control signal, a second electrode of the switch element receives the current source, and a third electrode of the switch element is electrically connected to the first feedback terminal; and a comparator, wherein a first terminal of the comparator receives a threshold voltage, a second terminal of the comparator is connected to the first feedback terminal, and an output terminal of the comparator is connected to the second feedback terminal.

In the display device of the present disclosure, the switch element is a transistor or a three-state gate.

In the display device of the present disclosure, the current source has a predetermined current value and a predetermined charge time, and the predetermined current value and the predetermined charge time are set according to the input voltage and the target voltage In the display device of the present disclosure, the predetermined current value is ranged from 80 microamperes to 150 microamperes, and the predetermined charge time is ranged from 0.5 milliseconds to 1.5 milliseconds.

In the display device of the present disclosure, the voltage conversion module includes a first transistor, a second transistor, an inductor, a capacitor, a diode, a first resistor, and a second resistor;

a gate electrode of the first transistor is connected to the first control terminal, a source of the first transistor receives the input voltage, a drain electrode of the first transistor, a source electrode of the second transistor, a first terminal of the inductor, and a cathode of the diode are connected together, a gate electrode of the second transistor is connected to the second control terminal, a drain electrode of the second transistor is grounded, a second terminal of the inductor, a first terminal of the capacitor, and a first terminal of the first resistor are connected to a target voltage output terminal, the target voltage output terminal outputs the target voltage, a second terminal of the first resistor and a first terminal of the second resistor are connected to the first feedback terminal, and an anode of the diode, a second terminal of the capacitor, and a second terminal of the second resistor are grounded.

In the display device of the present disclosure, the driving system of the display device further includes a power management integrated chip, and the control module, the detection module, the first transistor, and the second transistor are integrated and disposed in the power management integrated chip.

In the display device of the present disclosure, the driving system of the display device further includes a timing control chip, the timing control chip is connected to the voltage conversion module, and the timing control chip is configured to receive the target voltage.

The present disclosure provides a display device and a driving system thereof. The driving system of the display device includes the control module, the voltage conversion module, and the detection module which are interconnected. The detection module is added in the driving system of the display device. When the display device is turned on, the detection module is configured to detect the voltage conversion module to ensure that the voltage conversion module outputs a stable target voltage when the voltage conversion module is operated normally, thereby avoiding the components receiving the target voltage in the display device from being damaged.

BRIEF DESCRIPTION OF DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and those skilled in the art may still derive other drawings from these accompanying drawings without creative efforts.

DETAILED DESCRIPTION OF EMBODIMENTS

A clear and complete description of the technical schemes in the embodiments of the present disclosure is made in conjunction with the accompanying drawings in the embodiments of the present disclosure. The described embodiments are merely a part and not all of the embodiments of the present disclosure. Based on the embodiments of the present disclosure, all other embodiments acquired by those skilled in the art without any inventive efforts are within the scope of protection of the present disclosure.

Figure 1:
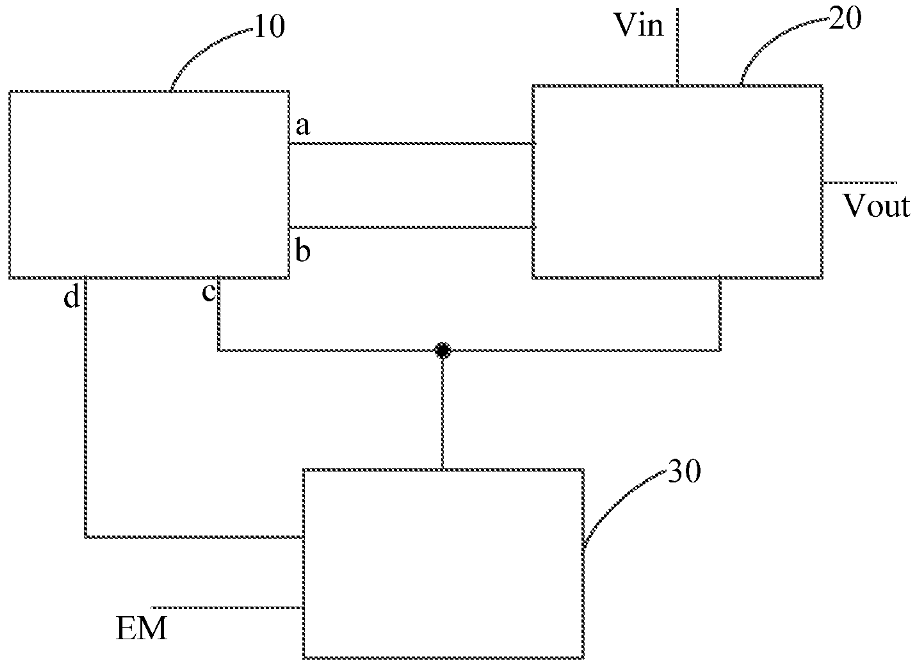
FIG. 1 illustrates a first structure diagram of a driving system of a display device provided by the present disclosure.

Please refer to FIG. 1. FIG. 1 illustrates a first structure diagram of a driving system of a display device provided by the present disclosure. As shown in FIG. 1, the driving system of the display device provided by the present disclosure includes a control module 10, a voltage conversion module 20, and a detection module 30 which are interconnected.

The control module 10 includes a first control terminal a, a second control terminal b, a first feedback terminal c, and a second feedback terminal d. The control module 10 is configured to output a first control signal at the first control terminal a and output a second control single at the second control terminal b under control of a first feedback signal received at the first feedback terminal c and a second feedback signal received at the second feedback terminal d.

The voltage conversion module 20 receives an input voltage Vin and is electrically connected to the first control terminal a, the second control terminal b, and the first feedback terminal c. The voltage conversion module 20 is configured to convert the input voltage Vin into a target voltage Vout and output the first feedback signal to the first feedback terminal c under control of the first control signal and the second control signal.

The detection module 30 receives a third control signal EM and is electrically connected to the first feedback terminal c and the second feedback terminal d. The detection module 30 is configured to detect, under control of the third control signal EM after the display device is turned on, a voltage level at the first feedback terminal c, and is configured to output the second feedback signal to the second feedback terminal d based on the voltage level at the first feedback terminal c.

Furthermore, the driving system of the display device may further include a control board and a system chip (not shown in FIG. 1). The control module 10, the voltage conversion module 20, and the detection module 30 are all disposed on the control board. The input voltage Vin may be provided for the voltage conversion module 20 by the system chip. The third control signal EM received by the detection module 30 may be provided by the system chip as well.

In the embodiment of the present disclosure, the input voltage Vin and the target voltage Vout are not limited and may be set according to voltage values which are required when components of the display device are operated normally.

In the embodiment of the present disclosure, the detection module 30 is added in the driving system of the display device. When the display device is turned on, the detection module 30 is configured to detect the voltage level at the first feedback terminal c (corresponding to a node to which the voltage conversion module 20 is connected) and configured to output the second feedback signal to the control module 10. When the voltage level at the first feedback terminal c is abnormal, the control module 10 is configured to output the first control signal and the second control signal according to the second feedback signal to turn off the voltage conversion module 20, thereby avoiding the components of the display device being damaged. When the voltage level at the first feedback terminal c is normal, the control module 10 is configured to output the first control signal and the second control signal according to the second feedback signal to control the voltage conversion module 20 to convert the input voltage Vin into the target voltage Vout, thereby ensuring the components of the display device are operated normally.

Figure 2:
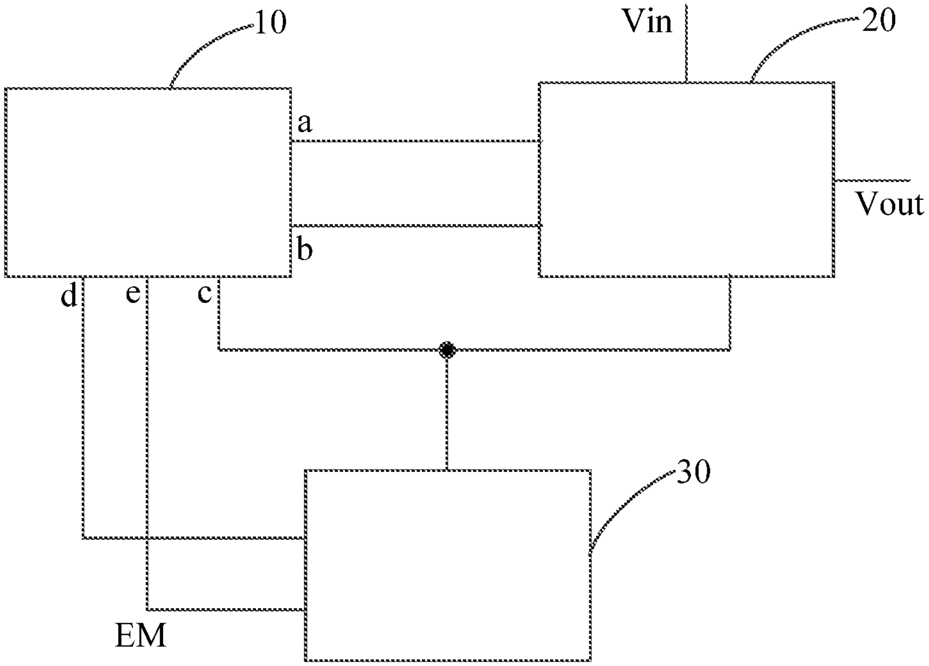
FIG. 2 illustrates a second structure diagram of a driving system of a display device provided by the present disclosure.

Please refer to FIG. 2. FIG. 2 illustrates a second structure diagram of a driving system of a display device provided by the present disclosure. A difference between the driving system of the display device in FIG. 2 and the driving system of the display device in FIG. 1 is that the control module 10 provided by the embodiment of the present disclosure further includes a third control terminal e. The control module is further configured to output the third control signal EM to the detection module 30 via the third control terminal e after the display device is turned on, so that the detection module 30 is configured to detect the voltage level at the first feedback terminal c.

Figure 3:
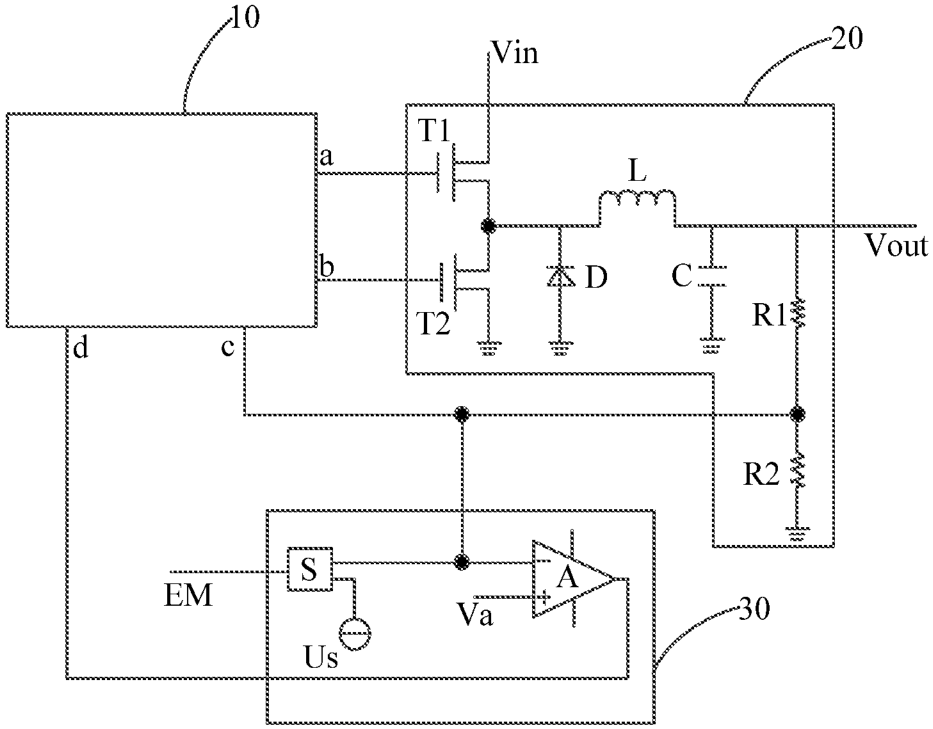
FIG. 3 illustrates a third structure diagram of a driving system of a display device provided by the present disclosure.

Please refer to FIG. 3. FIG. 3 illustrates a third structure diagram of a driving system of a display device provided by the present disclosure. As shown in FIG. 3, the voltage conversion module 20 includes a first transistor T1, a second transistor T2, an inductor L, a capacitor C, a diode D, a first resistor R1, and a second resistor R2.

A gate electrode of the first transistor T1 is connected to the first control terminal a. A source of the first transistor T1 receives the input voltage Vin. A drain electrode of the first transistor T1, a source electrode of the second transistor T2, a first terminal of the inductor L, and a cathode of the diode D are connected together. A gate electrode of the second transistor T2 is connected to the second control terminal b. A drain electrode of the second transistor T2 is grounded. A second terminal of the inductor L, a first terminal of the capacitor C, and a first terminal of the first resistor R1 are connected to a target voltage output terminal. The voltage conversion module 20 is configured to output the target voltage Vout at the target voltage output terminal. A second terminal of the first resistor R1 and a first terminal of the second resistor R2 are connected to the first feedback terminal c. An anode of the diode D, a second terminal of the capacitor C, and a second terminal of the second resistor are R2 grounded.

The detection module includes includes a current source Us, a switch element S, and a comparator A.

A first electrode of the switch element S receives the third control signal EM. A second electrode of the switch element S receives the current source Us. A third electrode of the switch element S is electrically connected to the first feedback terminal c. A first terminal of the comparator A receives a threshold voltage Va. A second terminal of the comparator A is connected to the first feedback terminal c. An output terminal of the comparator A is connected to the second feedback terminal d.

In the embodiment of the present disclosure, when the display device is turned on, the switch element S receives the third control signal EM to turn on the switch element S. The current source Us charges the first feedback terminal c via the switch element S. The comparator A outputs the second feedback signal to the second feedback terminal d of the control module 10 based on the voltage level of the first feedback terminal c and the threshold voltage Va. The control module is configured to output the first control signal at the first control terminal a and output the second control single at the second control terminal b according to the second feedback signal received at the second feedback terminal d. The voltage level of the first feedback terminal c is the first feedback signal outputted to the first feedback terminal c by the voltage conversion module 20.

In detail, when the second resistor R2 of the voltage conversion module 20 is short-circuited to a ground or a connection line between the first feedback terminal c and the voltage conversion module 20 is short-circuited to the ground, the voltage level of the first feedback terminal c is not changed to remains at 0V during the stage of turning on the display device and using the current source Us to charge the feedback terminal c. In the meantime, the second feedback signal outputted by the comparator A is a high voltage level signal. The control module 10 is configured to output the first control signal and the second control signal to control the first transistor and the second transistor to be turned off after receiving the second feedback signal. Accordingly, the voltage conversion module is turned off, thereby avoiding that the components receiving the target voltage Vout from are damaged when the target voltage Vout is increased due to the short circuit inside the voltage conversion module 20.

When no short circuit occurs inside the voltage conversion module 20, the voltage level of the first feedback terminal c is increased during the stage of turning on the display device and using the current source Us to charge the feedback terminal c. In the meantime, the second feedback signal outputted by the comparator A is a low voltage level signal. The control module 10 is configured to output the first control signal and the second control signal to control the first transistor and the second transistor to be turned on after receiving the second feedback signal. Accordingly, the voltage conversion module is configured to convert the input voltage Vin into the target voltage Vout, so that the components receiving the target voltage Vout are operated normally.

It is noted that when the display device is operated normally, the comparator A continuously outputs the low voltage level signal to the second feedback terminal d of the control module 10 to control the control module 10 and the voltage conversion module 20 to be operated normally. When the second resistor R2 of the voltage conversion module 20 is short-circuited to the ground or the connection line between the first feedback terminal c and the voltage conversion module 20 is short-circuited to the ground suddenly, the voltage level of the first feedback terminal c is decreased to be at 0V. The comparator A outputs the high voltage level signal to the second feedback terminal d of the control module 10. The control module 10 is configured to output the first control signal and the second control signal to turn off the voltage conversion module 20, thereby implementing the protection of the components in the display device.

In the embodiment of the present disclosure, the first control signal and the second control signal are not limited and may be set according to types of the first transistor T1 and the second transistor T2.

In the embodiment of the present disclosure, specifications of the inductor L, the capacitor C, the diode D, the first resistor R1, and the second resistor R2 may be set according to practical requirements.

In the embodiment of the present disclosure, the threshold voltage Va received by the first terminal of the comparator A may be set according to the target voltage Vout of the voltage conversion module 20, the first resistor R1, and the second resistor R2. When the threshold voltage Va is greater than the voltage level at the first feedback terminal c, the comparator A outputs the high voltage level signal. When the threshold voltage Va is smaller than the voltage level at the first feedback terminal c, the comparator A outputs the low voltage level signal. These two situations can be contrary and are not limited in the present disclosure.

In the embodiment of the present disclosure, the current source Us has a predetermined current value and a predetermined charge time, and the predetermined current value and the predetermined charge time are set according to the input voltage Vin and the target voltage Vout.

Figure 4:
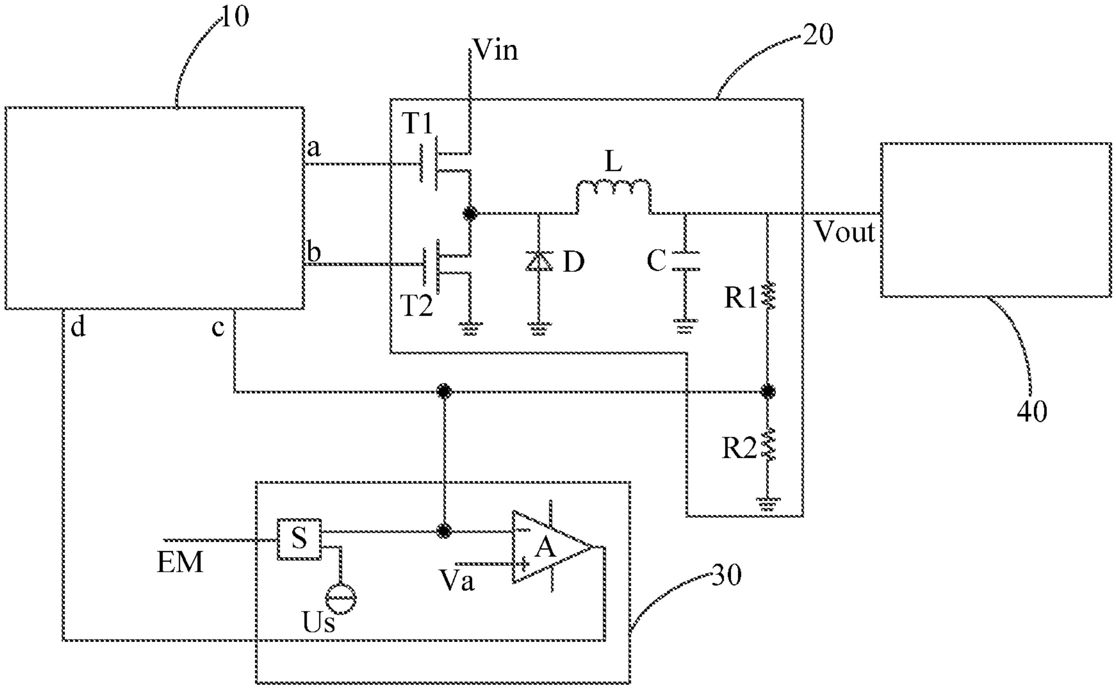
FIG. 4 illustrates a fourth structure diagram of a driving system of a display device provided by the present disclosure.

In detail, in on example of the display device in the embodiment of the present disclosure, the input voltage Vin may be 12V, and the target voltage Vout may be 3.3V. Please refer to FIG. 4. FIG. 4 illustrates a fourth structure diagram of a driving system of a display device provided by the present disclosure. As shown in FIG. 4, in the embodiment of the present disclosure, the driving system of the display device further includes a timing control chip 40. The timing control chip 40 is connected to the voltage conversion module 20 and configured to receive the target voltage Vout.

In general, when the timing control chip 40 is operated normally, the input voltage Vin received by the voltage conversion module 20 is 12V. The target voltage Vout is 3.3V by setting resistance values of the first resistor R1 and the second resistor R2. In the meantime, the voltage level at the first feedback terminal c is 0.6V. The control module 10 is configured to remain a stable output of the target voltage Vout according to the voltage level at the first feedback terminal c. Based on this, the threshold voltage Va received by the first terminal of the comparator A can be set as 0.3V. A current value of the current source Us is ranged from 80 microamperes to 150 microamperes. When the display device is turned on, the current source Us charges the first feedback terminal c for 0.5 milliseconds to 1.5 milliseconds. When the voltage conversion module is operated normally, the voltage level at the first feedback terminal c can be increased to 0.6V. The second feedback signal outputted by the comparator A is the low voltage level signal.

Accordingly, when the second feedback signal outputted by the comparator A is the high voltage level signal, it can be determined that the second resistor R2 is short-circuited to the ground or the connection line between the first feedback terminal c and the voltage conversion module 20 is short-circuited to the ground. The control module 10 can output the first control signal and the second control single according to the second feedback signal to control the voltage conversion module 20 to be turned off. When the second feedback signal outputted by the comparator A is the low voltage level signal, it can be determined that the second resistor R2 is not short-circuited to the ground or the connection line between the first feedback terminal c and the voltage conversion module 20 is not short-circuited to the ground. The control module 10 can output the first control signal and the second control single according to the second feedback signal to control the voltage conversion module 20 to convert the input voltage Vin into the target voltage Vout.

Figure 5:
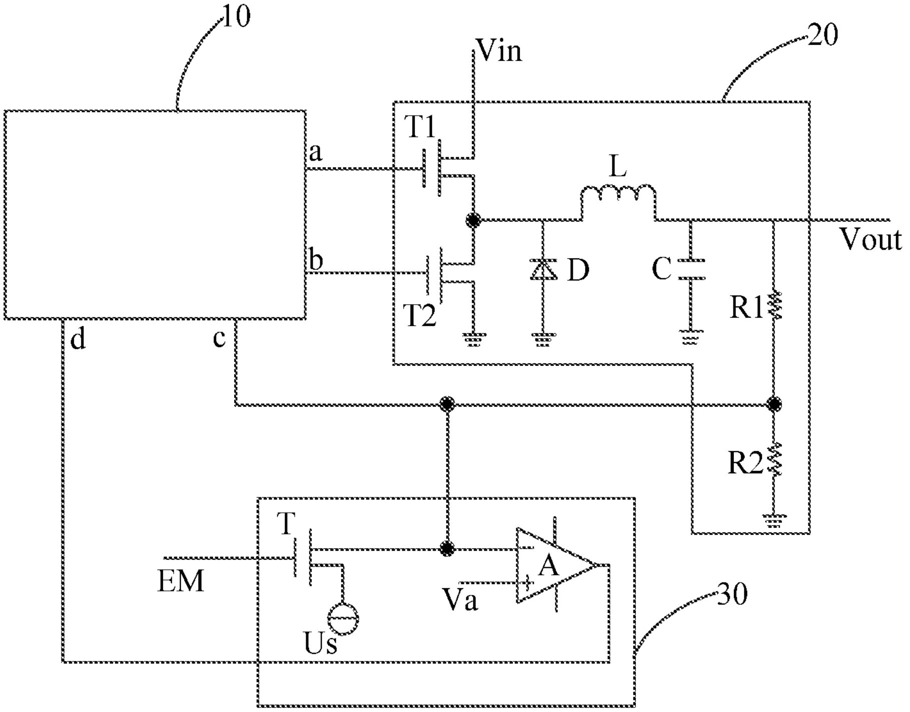
FIG. 5 illustrates a fifth structure diagram of a driving system of a display device provided by the present disclosure.

Please refer to FIG. 5. FIG. 5 illustrates a fifth structure diagram of a driving system of a display device provided by the present disclosure. As shown in FIG. 5, in the embodiment of the present disclosure, the switch element S is a transistor T. When the transistor T is an N-type transistor and the third control signal EM is a high voltage level signal, the transistor T is turned on and the current source Us charges the first feedback terminal c via the transistor T. When the third control signal EM is a low voltage level signal, the transistor T is turned off.

In another embodiment of the present disclosure, the switch element S is not limited and can be a three-state gate or a component having a switch function.

Figure 6:
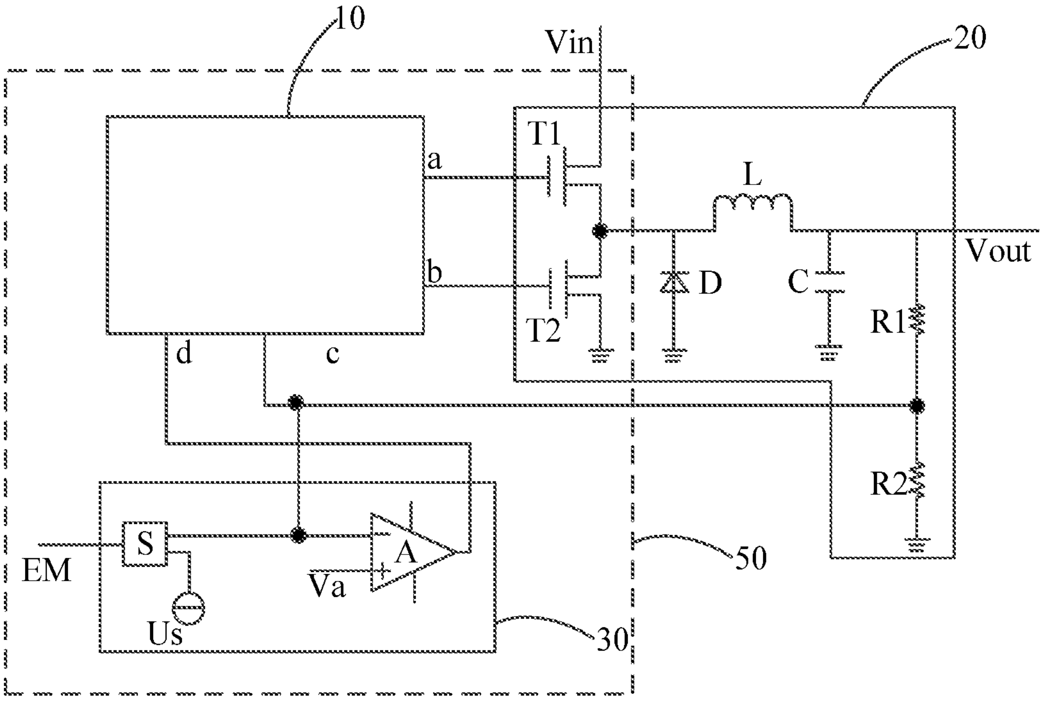
FIG. 6 illustrates a sixth structure diagram of a driving system of a display device provided by the present disclosure.

Please refer to FIG. 6. FIG. 6 illustrates a sixth structure diagram of a driving system of a display device provided by the present disclosure. A difference between the driving system of the display device in FIG. 6 and the driving system of the display device in FIG. 3 is that the driving system of the display device provided by the embodiment of the present disclosure further includes a power management integrated chip 50. The control module 10, the detection module 30, the first transistor T1, and the second transistor T2 are integrated and disposed in the power management integrated chip 50.

In the embodiment of the present disclosure, the control module 10, the detection module 30, the first transistor T1, and the second transistor T2 are integrated and disposed in the power management integrated chip 50, thereby increasing integration of the power management integrated chip 50 and simplifying lines on the control board to avoid signal interferences from occurring on the control board.

In another embodiment of the present disclosure, the control module 10 and the detection module 30 are disposed in the power management integrated chip 50, and the voltage conversion module 20 is disposed on a circuit board.

In yet another embodiment of the present disclosure, the control module 10 is disposed in the power management integrated chip 50, and the voltage conversion module 20 and the detection module 30 are disposed on the control board.

The transistors in all embodiments of the present disclosure can be thin film transistors, or other device having the same characteristics. The source electrodes and the drain electrodes of the transistors used herein are symmetric, and thus the source electrodes and the drain electrodes can be switchable. In the embodiments of the present disclosure, in order to distinguish two electrodes excluding a gate electrode of each of the transistors, one electrode of each of the transistors is called as a source electrode, and the other of each of the transistors is called as a drain electrode. In the drawings, a middle terminal of each of the transistors is a gate electrode, a signal input terminal is a source electrode, and a signal output terminal is a drain electrode. Furthermore, the transistors used in the embodiments of the present disclosure can include P-type transistors and/or N-type transistors. The P-type transistors are turned on when the gate electrodes are at a low voltage level. The P-type transistors are turned off when the gate electrodes are at a high voltage level. The N-type transistors are turned on when the gate electrodes are at a high voltage level. The N-type transistors are turned off when the gate electrodes are at a low voltage level.

Correspondingly, the present disclosure further provides a display device. The display device includes the driving system of the display device in any one of the embodiments. Detailed description can be referred to the above-mentioned description and are not repeated herein. Furthermore, the display device is not limited in the present disclosure and can be a smart mobile phone, a tablet computer, an e-book reader, a smart watch, a camera, a game machine, etc.

The display device provided by the present disclosure includes the driving system. The driving system of the display device the control module, the voltage conversion module, and the detection module which are interconnected. The detection module is added in the driving system of the display device. When the display device is turned on, the detection module is configured to detect the voltage conversion module to ensure that the voltage conversion module outputs a stable target voltage, thereby avoiding the components in the display device from being damaged and extending the lifespan of the display device.

The display device and the driving system thereof provided by the embodiments of the present disclosure are described in detail as above. The embodiments are used to describe the principle and the implementations of the present disclosure. It should be understood that present disclosure is not limited to the exemplary examples. Those skilled in the art may achieve equivalent improvements or replacements according to the above description. The equivalent improvements and replacements should be considered to belong to the protection scope of the present disclosure.

What is claimed is:

1. A driving system of a display device, comprising:

a control module, wherein the control module comprises a first control terminal, a second control terminal, a first feedback terminal, and a second feedback terminal, and the control module is configured to output a first control signal at the first control terminal and output a second control single at the second control terminal under control of a first feedback signal received at the first feedback terminal and a second feedback signal received at the second feedback terminal;

a voltage conversion module, wherein the voltage conversion module receives an input voltage and is electrically connected to the first control terminal, the second control terminal, and the first feedback terminal, and the voltage conversion module is configured to convert the input voltage into a target voltage and output the first feedback signal to the first feedback terminal under control of the first control signal and the second control signal; and a detection module, wherein the detection module receives a third control signal and is electrically connected to the first feedback terminal and the second feedback terminal, and the detection module is configured to detect, under control of the third control signal after the display device is turned on, a voltage level at the first feedback terminal, and is configured to output the second feedback signal to the second feedback terminal based on the voltage level at the first feedback terminal;

wherein in response to the voltage level at the first feedback terminal being abnormal, the control module is configured to output the first control signal and the second control signal according to the second feedback signal to turn off the voltage conversion module, wherein the voltage conversion module comprises a first transistor, a second transistor, an inductor, a capacitor, a diode, a first resistor, and a second resistor;

a gate electrode of the first transistor is connected to the first control terminal, a source of the first transistor receives the input voltage, a drain electrode of the first transistor, a source electrode of the second transistor, a first terminal of the inductor, and a cathode of the diode are connected together, a gate electrode of the second transistor is connected to the second control terminal, a drain electrode of the second transistor is grounded, a second terminal of the inductor, a first terminal of the capacitor, and a first terminal of the first resistor are connected to a target voltage output terminal, the target voltage output terminal outputs the target voltage, a second terminal of the first resistor and a first terminal of the second resistor are connected to the first feedback terminal, and an anode of the diode, a second terminal of the capacitor, and a second terminal of the second resistor are grounded.

2. The driving system of the display device of claim 1, wherein the control module further comprises a third control terminal, and the control module is further configured to output the third control signal to the detection module via the third control terminal after the display device is turned on.

3. The driving system of the display device of claim 1, wherein the detection module comprises:

a current source;

a switch element, wherein a first electrode of the switch element receives the third control signal, a second electrode of the switch element receives the current source, and a third electrode of the switch element is electrically connected to the first feedback terminal; and a comparator, wherein a first terminal of the comparator receives a threshold voltage, a second terminal of the comparator is connected to the first feedback terminal, and an output terminal of the comparator is connected to the second feedback terminal.

4. The driving system of the display device of claim 3, wherein the switch element is a transistor or a three-state gate.

5. The driving system of the display device of claim 3, wherein the current source has a predetermined current value and a predetermined charge time, and the predetermined current value and the predetermined charge time are set according to the input voltage and the target voltage.

6. The driving system of the display device of claim 5, wherein the predetermined current value is ranged from 80 microamperes to 150 microamperes, and the predetermined charge time is ranged from 0.5 milliseconds to 1.5 milliseconds.

7. The driving system of the display device of claim 1, wherein the driving system of the display device further comprises a power management integrated chip, and the control module, the detection module, the first transistor, and the second transistor are integrated and disposed in the power management integrated chip.

8. The driving system of the display device of claim 1, wherein the driving system of the display device further comprises a timing control chip, the timing control chip is connected to the voltage conversion module, and the timing control chip is configured to receive the target voltage.

9. A display device, comprising a driving system of the display device, the driving system of the display device comprising:

a control module, wherein the control module comprises a first control terminal, a second control terminal, a first feedback terminal, and a second feedback terminal, and the control module is configured to output a first control signal at the first control terminal and output a second control single at the second control terminal under control of a first feedback signal received at the first feedback terminal and a second feedback signal received at the second feedback terminal;

a voltage conversion module, wherein the voltage conversion module receives an input voltage and is electrically connected to the first control terminal, the second control terminal, and the first feedback terminal, and the voltage conversion module is configured to convert the input voltage into a target voltage and output the first feedback signal to the first feedback terminal under control of the first control signal and the second control signal; and a detection module, wherein the detection module receives a third control signal and is electrically connected to the first feedback terminal and the second feedback terminal, and the detection module is configured to detect, under control of the third control signal after the display device is turned on, a voltage level at the first feedback terminal, and is configured to output the second feedback signal to the second feedback terminal based on the voltage level at the first feedback terminal;

wherein in response to the voltage level at the first feedback terminal being abnormal, the control module is configured to output the first control signal and the second control signal according to the second feedback signal to turn off the voltage conversion module, wherein the voltage conversion module comprises a first transistor, a second transistor, an inductor, a capacitor, a diode, a first resistor, and a second resistor;

a gate electrode of the first transistor is connected to the first control terminal, a source of the first transistor receives the input voltage, a drain electrode of the first transistor, a source electrode of the second transistor, a first terminal of the inductor, and a cathode of the diode are connected together, a gate electrode of the second transistor is connected to the second control terminal, a drain electrode of the second transistor is grounded, a second terminal of the inductor, a first terminal of the capacitor, and a first terminal of the first resistor are connected to a target voltage output terminal, the target voltage output terminal outputs the target voltage, a second terminal of the first resistor and a first terminal of the second resistor are connected to the first feedback terminal, and an anode of the diode, a second terminal of the capacitor, and a second terminal of the second resistor are grounded.

10. The display device of claim 9, wherein the control module further comprises a third control terminal, and the control module is further configured to output the third control signal to the detection module via the third control terminal after the display device is turned on.

11. The display device of claim 9, wherein the detection module comprises:

a current source;

a switch element, wherein a first electrode of the switch element receives the third control signal, a second electrode of the switch element receives the current source, and a third electrode of the switch element is electrically connected to the first feedback terminal; and a comparator, wherein a first terminal of the comparator receives a threshold voltage, a second terminal of the comparator is connected to the first feedback terminal, and an output terminal of the comparator is connected to the second feedback terminal.

12. The display device of claim 11, wherein the switch element is a transistor or a three-state gate.

13. The display device of claim 11, wherein the current source has a predetermined current value and a predetermined charge time, and the predetermined current value and the predetermined charge time are set according to the input voltage and the target voltage.

14. The display device of claim 13, wherein the predetermined current value is ranged from 80 microamperes to 150 microamperes, and the predetermined charge time is ranged from 0.5 milliseconds to 1.5 milliseconds.

15. The display device of claim 9, wherein the driving system of the display device further comprises a power management integrated chip, and the control module, the detection module, the first transistor, and the second transistor are integrated and disposed in the power management integrated chip.

16. The display device of claim 9, wherein the driving system of the display device further comprises a timing control chip, the timing control chip is connected to the voltage conversion module, and the timing control chip is configured to receive the target voltage.

* * * * *